(12) United States Patent
Zimmermann et al.

(10) Patent No.: US 12,540,300 B2
(45) Date of Patent: Feb. 3, 2026

(54) BIOREACTOR AND METHOD FOR CULTIVATING BIOLOGICAL CELLS ON SUBSTRATE FILAMENTS

(71) Applicant: Fraunhofer-Gesellschaft zur Foerderung der angewandten Forschung e.V., Munich (DE)

(72) Inventors: Heiko Zimmermann, Sulzbach (DE); Julia Neubauer, Wuerzburg (DE); Michael Gepp, Sulzbach (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 969 days.

(21) Appl. No.: 17/278,560

(22) PCT Filed: Sep. 23, 2019

(86) PCT No.: PCT/EP2019/075539
§ 371 (c)(1),
(2) Date: Mar. 22, 2021

(87) PCT Pub. No.: WO2020/064639
PCT Pub. Date: Apr. 2, 2020

(65) Prior Publication Data
US 2021/0348101 A1    Nov. 11, 2021

(30) Foreign Application Priority Data
Sep. 25, 2018    (DE) .......................... 102018123553.4

(51) Int. Cl.
*C12N 1/04*    (2006.01)
*C12M 1/00*    (2006.01)
(Continued)

(52) U.S. Cl.
CPC ............ *C12M 25/10* (2013.01); *C12M 27/00* (2013.01); *C12M 41/06* (2013.01); *C12N 1/04* (2013.01); *C12M 47/02* (2013.01)

(58) Field of Classification Search
CPC ...... C12M 25/10; C12M 41/06; C12M 27/00; C12M 47/02; C12M 23/20; C12M 25/02; C12M 41/12; C12M 47/04; C12N 1/04
See application file for complete search history.

(56) References Cited

U.S. PATENT DOCUMENTS

2003/0219889 A1    11/2003    Sumaru et al.
2004/0029265 A1    2/2004    Doi et al.
(Continued)

FOREIGN PATENT DOCUMENTS

CN    101960004 A    1/2011
DE    102011002763 A1 *    7/2012    ............ C12M 21/02
(Continued)

OTHER PUBLICATIONS

Landry et al. "Layers and Multilayers of Self-Assembled Polymers: Tunable Engineered Extracellular Matrix Coating for Neural Cell Growth" Langmuir 2018, 34, 8709-8730.*
(Continued)

*Primary Examiner* — Tracy Vivlemore
*Assistant Examiner* — Lauren K Van Buren
(74) *Attorney, Agent, or Firm* — Caesar Rivise, PC

(57) ABSTRACT

The invention relates to a bioreactor (100) which is designed for cultivating biological cells (1), comprising a container (10) configured to receive a cultivation medium (2), and a plurality of substrate filaments (20) which are arranged in the container (10) and are configured for a temporary adherent coupling of the biological cells (1) to the substrate filaments (20). The substrate filaments (20) are provided with a surface layer (21) which is switchable between an
(Continued)

adherence state, in which the biological cells (1) can be coupled adherently to the surface layer (21), and a release state, in which the adherent coupling of the biological cells (1) to the surface layer (21) is reduced in comparison to the binding state. The invention also relates to a method for processing biological cells (1) in the bioreactor (100).

6 Claims, 2 Drawing Sheets

(51) Int. Cl.
  *C12M 1/02*   (2006.01)
  *C12M 1/12*   (2006.01)

(56) References Cited

U.S. PATENT DOCUMENTS

| | | |
|---|---|---|
| 2009/0017541 A1 | 1/2009 | Kodama |
| 2010/0216240 A1 | 8/2010 | Moolman et al. |
| 2011/0281343 A1* | 11/2011 | Gay ............ C12M 25/00 435/287.1 |
| 2015/0093823 A1 | 4/2015 | Sutton et al. |

FOREIGN PATENT DOCUMENTS

| | | | | |
|---|---|---|---|---|
| EP | 2298858 A1 * | 3/2011 | ............ | C12M 35/08 |
| JP | H06-23389 A | 2/1994 | | |
| JP | H06-169755 A | 6/1994 | | |
| JP | H0923876 A | 1/1997 | | |
| JP | 2001-321157 A | 11/2001 | | |
| JP | 2003-339373 A | 12/2003 | | |
| JP | 2012-34609 A | 2/2012 | | |
| JP | 2013-99282 A | 5/2013 | | |
| TW | 201504433 A | 2/2015 | | |
| WO | WO-2009069967 A2 * | 6/2009 | ............ | C12M 1/00 |
| WO | 2011116921 A1 | 9/2011 | | |

OTHER PUBLICATIONS

Auernheimer et al. "Photoswitched Cell Adhesion on Surfaces with RGD Peptides" Journal of the American Chemical Society, vol. 127, Issue 46 (Year: 2005).*
Jiang "Recent Advances in light-induced cell sheet technology" Acta Biomaterialia 119 (2021), 30-41 (Year: 2021).*
Machine Translation for JP H06-23389 A (1994).
Machine Translation for JP H06-169755 A (1994).
Machine Translation for JP 2012-34609 A (2012).
Japanese Office Action re JP-A—2021-516882 dated May 9, 2023 with Translation.
English Abstract for JP 2001-321157 A (2001).
English Abstract for JP 2013-99282 A (2013).
Chinese Office Action for CN 201980063161.6 dated Dec. 1, 2023.
English Abstract for JP H0923876 A (1997).
Garcia et al. (2007). Photo-, thermally, and pH-responsive microgels†. Langmuir, 23(1), 224-229.
Hao et al. (2018). Photo-responsive smart surfaces with controllable cell adhesion. Journal of Photochemistry and Photobiology A: Chemistry, 355, 202-211.
Jiang et al. (2016). A photo, temperature, and pH responsive spiropyran-functionalized polymer: Synthesis, self-assembly and controlled release. Polymer 83, 85-91.
Landry et al. (2018). Layers and multilayers of self-assembled polymers: Tunable engineered extracellular matrix coatings for neural cell growth. Langmuir, 34, 8709-8730.
Watson et al. (2016). Efficient production and enhanced tumor delivery of engineered extracellular vesicles. Biomaterials, 105, 195-205.
Zheng et al. (2013). Precise control of cell adhesion by combination of surface chemistry and soft lithography. Advanced Healthcare Materials, 2, 95-108.
Korean Office Action dated Nov. 20, 2024.

* cited by examiner

BIOREACTOR AND METHOD FOR CULTIVATING BIOLOGICAL CELLS ON SUBSTRATE FILAMENTS

CROSS-REFERENCE TO RELATED APPLICATIONS

This application is a U.S. National Phase Application of PCT/EP2019/075539, filed Sep. 23, 2019, which claims priority to DE 102018123553.4, filed Sep. 25, 2018, the contents of which applications are incorporated herein by reference in their entireties for all purposes.

BACKGROUND OF THE INVENTION

The invention relates to a bioreactor for culturing biological cells, in particular a bioreactor which contains substrate filaments with adherence for the cells and which is adapted for the culturing of the cells in the adherently bound state. The invention also relates to a method for culturing biological cells, wherein the bioreactor is used. Applications of the invention are available, for example, in biology, biotechnology, biochemistry and medicine, in particular in the culturing of biological cells and/or in tissue engineering.

The culturing of adherent biological cells on the bottom of cell culture vessels, for example dishes, is known in general. In numerous applications, for example in biotechnology and medicine, in particular in tissue engineering or in cell screening, there is an interest in culturing very large quantities of cells. Simple cell culture vessels are unsuitable for these applications because of the reduced efficiency, scalability and cell yield. Therefore, for the culturing of adherent cells, for example induced pluripotent stem cells, culturing surfaces with a high surface-to-volume ratio (total surface area of the culturing surfaces/volume of the vessel) are used, which enable increased efficiency and cell yield. An example thereof known from practice is adherent suspension culture on microcarriers or the processing of the cells in hollow fiber bioreactors.

Harvesting of cells from microcarriers or hollow fibers after cell expansion represents a challenge in the use of conventional techniques. Typically, the cells are harvested by treating the adherent cells with enzymes which detach the cells from the culturing surfaces in question. It is disadvantageous here that, because of their low specificity, the enzymes can at the same time destroy membrane proteins of the cells. Furthermore, detaching the cells requires flow forces in the medium, which can lead to undesired shear stress on the cells.

D. C. Watson et al. describe, in "Biomaterials" 105 (2016) 195-205, a hollow fiber bioreactor with a container in which hollow fibers are arranged. Cells adhere to the outer surface of the hollow fibers. A culture medium flows through the hollow fibers, which culture medium reaches the cells through pores in the walls of the hollow fibers. Cell products are harvested by passing a liquid medium into the container and flushing the hollow fibers with the medium. The technique of D. C. Watson et al. is limited in that only the harvesting of cell products is described. To detach the cells from the hollow fibers, enzymatic detachment would be necessary. Furthermore, the hollow fibers have a relatively large diameter, which restricts the cell culture yield.

WO 2011/116921 A1 discloses a culture device with thermoreactive substrates, which are arranged for the adherent coupling of biological cells. However, because of a relatively low surface-to-volume ratio, this culture device has limited culturing efficiency and cell yield.

The objective of the invention is to provide an improved bioreactor for culturing biological cells, by means of which disadvantages of conventional techniques can be avoided. In particular, the bioreactor is intended to enable culturing of biological cells with increased efficiency and yield and/or with gentle detachment of cells from the culture substrate. In particular, the cells should be able to be detached with reduced flow-mechanics-related stress and/or chemical stress for the cells. Another objective of the invention is to provide an improved method for processing biological cells which can be implemented with the bioreactor and by means of which disadvantages of conventional techniques can be avoided.

These objectives are achieved, respectively, by a bioreactor and a method for processing biological cells, particularly cell culturing, carried out with said bioreactor of the invention.

BRIEF SUMMARY OF THE INVENTION

According to a first general aspect of the invention, the above-mentioned objective is achieved by a bioreactor which is adapted for culturing (in particular expansion and/or differentiation of) biological cells and comprises a container (housing, enclosure) for receiving a culture medium (nutrient medium) and a plurality of substrate filaments (fibers). The substrate filaments are arranged in the container spaced apart from one another and/or touching one another at least in sections, and are adapted for temporary (reversible) adherent coupling of the biological cells to surfaces of the substrate filaments. The substrate filaments, which may be configured to be rigid or flexible, provide fixed culturing surfaces in the bioreactor. The adherent coupling of the biological cells to surfaces of the substrate filaments comprises binding of the cells to the surfaces of the substrate filaments via a cell-substrate surface interaction, in particular via cell surface binding molecules.

According to the invention, the substrate filaments within the container have a variable surface layer, which can be switched between an adherence state (binding state, interaction state) and a release state. The surface layer may be a layer of a switchable material which forms a closed cover. Alternatively, the surface layer may be formed by a monolayer or sub-monolayer of switchable molecules. In the adherence state, the surface of the substrate filaments is configured for adherent coupling of the cells to the surface layer, i.e. the surface of the substrate filaments is formed such that the cells generate binding forces with the surface, under the action of which the cells are fixed to the surface. In the release state, the adherent coupling of the biological cells to the surface layer is reduced compared to the adherence state, i.e. the surface of the substrate filaments is formed such that the cells do not generate any binding forces with the surface, or the binding forces are reduced such that the cells are released from the surface or are detachable from the surface under the action of movements of medium, e.g. flows of the culture medium or of a flushing medium. The surface layer can be adapted for single (irreversible) switching or multiple (reversible) switching.

Advantageously, through the effect of the switchable surface layer, the bioreactor according to the invention enables detachment of cells from the substrate filaments without the action of enzymes or other chemical substances and without the action of flow forces, which would exert a shear stress that alters the cells. Furthermore, in comparison to conventional hollow fiber bioreactors, the substrate filaments with switchable surface layers enable the use of substrate filaments with a reduced diameter and/or an increased packing density, which has an advantageous effect on the efficiency and yield of the cell culturing due to an increased surface-to-volume ratio. Also in comparison to conventional techniques using thermoreactive substrates, a substantial increase in the surface-to-volume ratio can be achieved. At least 100, in particular at least 1000, for example 5000 or more substrate filaments can be arranged in a bioreactor, for example. The substrate filaments preferably have a packing density in the container of at least 10% (proportion by volume in the interior of the container), for example 35%, in particular 50% or more.

According to a second general aspect of the invention, the above-mentioned objectives are achieved by a method for processing biological cells in a bioreactor according to the invention, wherein, by setting the adherence state of the substrate filaments, temporary adherent coupling of the biological cells to the substrate filaments takes place. The culturing (optionally with a differentiation) of the temporarily adherently coupled biological cells takes place in the adherence state. Upon completion of the culturing, the release state of the substrate filaments is set, such that the biological cells can be detached from the substrate filaments.

Advantageously, different substances are available for providing the switchable surface layer. According to a first embodiment of the invention, the surface layer is switchable between the adherence state and the release state by the action of light. The light may contain wavelengths in the UV, visible, and/or IR spectral range. According to a second embodiment of the invention, the surface layer is switchable between the adherence state and the release state by the action of heat. Both embodiments can be combined, for example by the action of light, in particular IR illumination, generating a temperature change in the surface layer.

Preferably, in the first embodiment (light-responsive functionality of the surface layer), the adherence state is generated by the surface layer not being effectively illuminated, in particular being unilluminated, and the release state is set by an illumination of the surface layer. Alternatively, conversely, the adherence state can be set in the illuminated state of the surface layer, and the release state in the not effectively illuminated, in particular unilluminated, state of the surface layer. Advantageously, the light-responsive functionality of the surface layer can be based on various actions which include in particular a light-induced change in chemical properties of the surface layer (activation of binding molecules), a light-induced change in the temperature of the surface layer or a light-induced binding or release of substances to or from the surface layer.

In the first embodiment, a variant of the invention is preferred, in which the substrate filaments comprise light guides (or optical fibers), which are each adapted for connection to a switching light source device and for a switchable illumination of the surface layer out of the light guides. This advantageously achieves uniform illumination of the substrate filaments from the inside. The light guides are wave guides formed for example from glass or plastic, which can be compact or hollow and/or formed from a single material or multilayered. Each substrate filament can comprise one single light guide or a bundle of light guides, with the light guide(s) being provided with the surface layer.

A light guide with the surface layer described here, which is switchable between the adherence state and the release state using light, represents an independent subject matter of the invention, for which protection is claimed in the present patent application.

Advantageously, the switching light source device can comprise a plurality of separately switchable light sources. In this case, each substrate filament can be optically coupled to one of the light sources each, with the surface layer of each substrate filament being individually switchable between the adherence state and the release state by activation of the associated light source. This embodiment of the invention has the advantage that cells can be selectively released from the substrate filaments, for example for testing purposes or for delivering cells in different differentiation states. Alternatively, the switching light source device can comprise at least one light source, to which all substrate filaments are collectively optically coupled. In this case, all substrate filaments are switchable at the same time with the at least one light source.

The switching light source device is particularly preferably part of the bioreactor and is securely connected to the light guides of the substrate filaments. This advantageously achieves a compact construction of the bioreactor.

According to a particularly preferred variant of the first embodiment of the invention, the light guides are adapted for switchable illumination of the surface layer with evanescent waves, each of which penetrates from inside the light guides into the surface layer. This advantageously enables the use of available light guides with unstructured surfaces, in particular without additional measures for coupling out light. Furthermore, the selective illumination of individual light guides is facilitated, since the evanescent waves do not act on adjacent light guides.

In the first embodiment, the illumination can be controlled alternatively or additionally by at least one light source which is arranged in the container of the bioreactor. This advantageously allows the substrate filaments to be illuminated at their surface. The at least one light source can for example be arranged next to the substrate filaments in the container. Alternatively or additionally, the substrate filaments can bear active light sources, which comprise liquid-crystal switchable light elements, light-emitting diodes, in particular organic light-emitting diodes (OLED), and/or chemiluminescent light elements, which are each adapted for switchable illumination of the surface layer. These light sources can be arranged on the surfaces of light guides or other wire- or strip-shaped filaments, for example made of plastic or glass. Advantageously, the active light sources enable increased illumination intensity in comparison to illumination with evanescent waves.

In the first embodiment of the invention, according to preferred variants of the invention, the surface layer can comprise a light-responsive hydrogel layer, in particular an alginate layer, and/or a functionalization layer on the surface of the substrate filaments. All substrate filaments in the bioreactor can have the same surface layer, or the substrate filaments can have different surface layers.

The light-responsive hydrogel layer is a layer made of a hydrogel polymer, the capacity of which for binding biological cells is dependent on illumination. This functionality can be provided directly by the polymer of the hydrogel (covalently) and/or by composite formation of the hydrogel layer using a hydrogel polymer and light-responsive constituents, for instance micelles, microparticles, nanoparticles. Suitable hydrogel polymers include, for example, alginate, gelatin, polyacrylamide, gellan gum, hyaluronic acid, or polyvinyl alcohols or hydrogel polymers with similar properties to these examples. Light-responsive constituents can be, for example, vesicles with embedded metal nanoparticles and active substances. Upon illumination of the surface layer, the nanoparticles can be heated such that the vesicles burst and release the active substances, which for example are adapted for detaching the cells from the surface layer. In a deviation from conventional enzymatic detachment, the active substances act locally at the surface layer, such that undesired influence on the cells can be minimized to a negligible level or excluded.

The functionalization layer can for example be formed from azobenzenes, O-nitrobenzyl groups and/or benzonitriles, which are arranged at the surface of the substrate filaments, in particular of the light guides.

According to the second embodiment of the invention, the surface layer is switchable between the adherence state and the release state in response to a positive or negative action of heat (or thermal action). The adherence state and the release state can each be set by cooling and heating (or vice-versa) of the substrate filaments. Advantageously, further stimulable molecules can thus be used to form the surface layer.

The substrate filaments preferably comprise hollow fibers, which are each adapted for connection to a temperature-control device and for switchable temperature control (cooling and/or heating) of the surface layer with a temperature-control medium flowing through the hollow fibers. The bioreactor can in particular be constructed as a hollow fiber bioreactor, but with the difference thereto that the hollow fibers are coated with a temperature-responsive layer (for example made of the polymer PNIPAAm). The hollow fibers may be adapted to be porous and for supplying the cells with a culture medium, with the switching of the surface layer taking place by adjusting the temperature of the culture medium. Alternatively, the hollow fibers can have impermeable walls and have a temperature-control medium, for example water, flow through them.

A hollow fiber with the surface layer described here, which is switchable between the adherence state and the release state using a change in temperature, represents an independent subject matter of the invention, for which protection is claimed in the present patent application.

In the second embodiment of the invention, the temperature can be controlled by a temperature-control device which is coupled to all hollow fibers. This advantageously allows all substrate filaments to be temperature-controlled simultaneously from the inside. However, preference is given to a variant of the invention in which the temperature-control device comprises a plurality of separately switchable temperature-control elements, and the hollow fibers are each adapted for connection to one of the temperature-control elements. In this case, the surface layer of each hollow fiber is individually switchable between the adherence state and the release state by activation of the associated temperature-control element.

In the second embodiment of the invention, the surface layer is preferably formed from a temperature-responsive hydrogel. Examples of hydrogels which can be used include in particular poly(N-isopropylacrylamide) (PNIPAAm), poly(N-vinylalkylamides), for example poly(N-vinylcaprolactam) or copolymers, for instance poly(L-lactic acid)-poly(ethylene glycol)-poly(L-lactic acid) (PLLA-PEG-PLLA) triblock copolymers, and/or poly(ethylene oxide)-polypropylene oxide)-poly(ethylene oxide) (PEO-PPO-PEO) copolymers, or temperature-responsive hydrogel polymers with similar properties to these examples.

According to a further preferred feature of the invention, the substrate filaments are flexible fibers which extend in the container of the bioreactor. The container particularly preferably has an elongate form (tubular or rectangular form) with a longitudinal direction, with the substrate filaments extending in the longitudinal direction of the container.

The container preferably has at least two fluid connectors which are arranged spaced apart from one another in order for the container to be flowed through by a liquid flushing medium. The fluid connectors are connected to a flushing medium reservoir and a switchable pump. The flushing medium comprises the culture medium or a physiological fluid. In the release state, the adherent coupling of the biological cells to the surface layer is reduced such that the biological cells can be separated from the substrate filaments under the action of the flow forces of the flushing medium. With provision of the elongate form of the container, the fluid connectors are preferably provided at mutually opposite ends of the container.

According to a further provided preferred feature of the invention, the container has at least one sensor connector, which is adapted for integrating at least one sensor into the bioreactor. The at least one sensor preferably comprises at least one from a temperature sensor, a pH sensor, a glucose sensor, a lactate sensor, a camera, or a RAMAN probe. The at least one sensor advantageously enables monitoring of the cell culture during operation of the bioreactor.

BRIEF DESCRIPTION OF THE DRAWINGS

Further details and advantages of the invention are described below with reference to the appended drawings. The drawings show.

DETAILED DESCRIPTION OF PREFERRED EMBODIMENTS

Preferred embodiments of the invention are described below with exemplary reference to bioreactors which are provided with light-responsive or heat-responsive substrate filaments. The implementation of the invention is not limited to these embodiments. Alternatively, light-responsive and heat-responsive substrate filaments can be combined in the bioreactor. Furthermore, the invention is not limited to the tubular form of the bioreactor shown by way of example. Depending on the application of the invention, other forms of the bioreactor, for instance box or sphere forms, can be selected. Furthermore, in a deviation from the examples shown, active light sources can be provided in the container of the bioreactor, on the substrate filaments and/or on an inner wall of the container. Details of the invention are described in particular with reference to the design and arrangement of the substrate filaments and the operation of the bioreactor. Details of the culturing of biological cells, in particular the differentiation of adherently-growing stem cells, are not described here, since they are known per se from conventional culturing processes.

Figure 1:
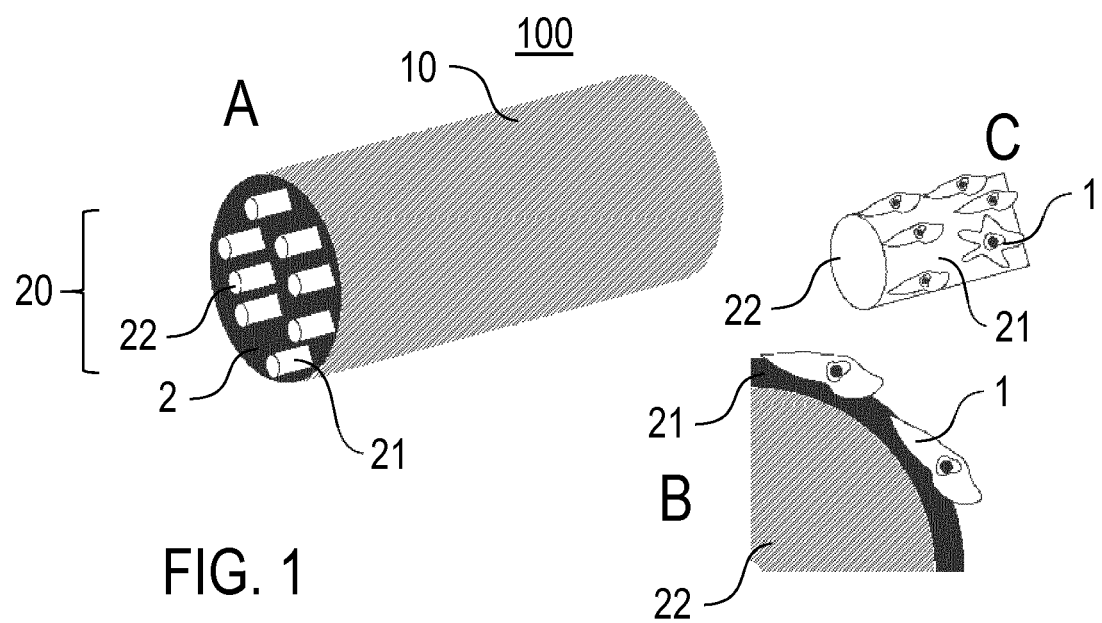
FIG. 1: a schematic depiction of the bioreactor according to the first embodiment of the invention.

According to the schematic partial view in FIG. 1, the first embodiment of the bioreactor 100 according to the invention comprises a container 10, in which a plurality of substrate filaments 20 are arranged. According to FIG. 1A, the container 10 has the form of a hollow cylinder. The container 10 is shown open here, but in operation has a container wall which is closed on all sides, optionally with fluid and sensor connectors (see FIG. 2), windows and/or further access openings.

The substrate filaments 20 extend in the axial direction of the container 10. The axial length of the container 10 is for example 20 cm, and the diameter of the container 10 is for example 5 cm.

10000 substrate filaments 20 are arranged in the container 10, for example. The container 10 is filled with a culture medium 2, which flushes around the substrate filaments 20. The culture medium 2 preferably flows through the container 10 (see FIGS. 2 and 5). The culture medium 2 comprises for example mTeSR 1 medium (mTeSR is a product name).

Each substrate filament 20 comprises a light guide 22 with a switchable surface layer 21, as illustrated in the schematic partial sectional view in FIGS. 1B and in the schematic partial perspective view in FIG. 1C. The light guide 22 is a compact fiber, for example made of glass. The diameter of the light guide 22 is for example 200 µm.

The surface layer 21, comprising for example a light-responsive alginate with PNIPAAm coupled thereto, is arranged on the surface of the light guide 22. The thickness of the surface layer 21 is for example 0.01 µm. The surface layer 21 is switchable between an adherence state, in which the biological cells 1 are coupled to the surface layer 21 in an adherent manner (see FIGS. 1B and 1C), and a release state, in which the biological cells 1 can be detached from the surface layer 21 (see FIG. 3B).

Figure 2:
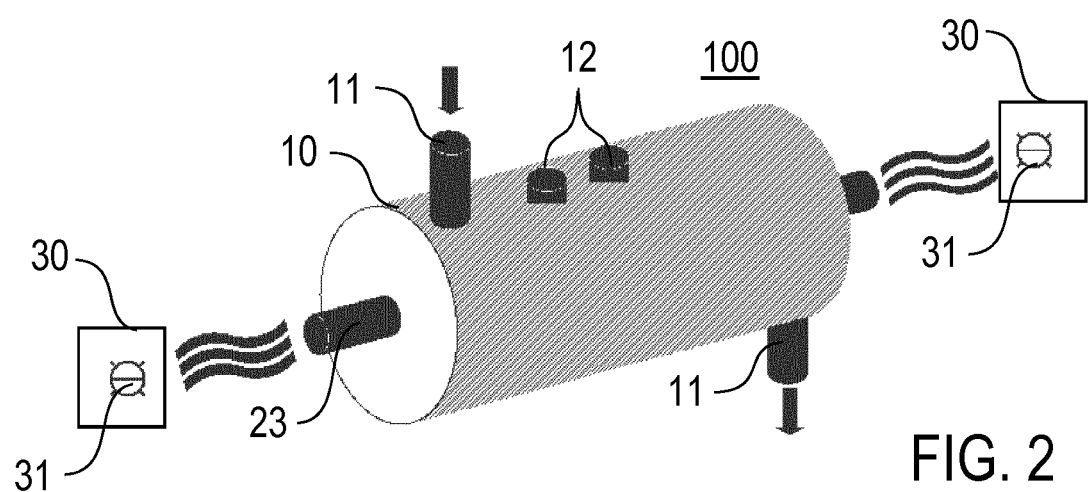
FIG. 2: further details of the bioreactor according to the first embodiment of the invention.

FIG. 2 shows further details of the first embodiment of the bioreactor 100 according to the invention. At the axial ends of the container 10, the substrate filaments 20 emerge from the container wall as a common bundle 23. A switching light source device 30 comprises two light sources 31, for instance two laser sources, which are adapted for irradiating the free ends of the substrate filaments 20. The irradiation is switchable by actuating the light sources 31 or by shutters (not shown), such that the substrate filaments 20 can be varied between an illuminated state and an unilluminated state. Preferably, the surface layer 21 (see FIG. 1B) is designed such that in the unilluminated state the adherence state of the substrate filaments 20 is set and in the illuminated state the release state of same is set.

FIG. 2 additionally shows two fluid connectors 11 which are arranged for permanent or temporary connection to a fluid system and which enable supply and discharge of a liquid medium to and from the container 10. The fluid connectors 11 are for example connected to a pump and a medium reservoir, as described below with reference to FIG. 5. The fluid connectors 11 are directly connected to the interior of the container 10 for receiving the culture medium, and thereby enable the automated exchange of media during culturing, in particular expansion, but also the inoculation/removal of cells in suspension. Furthermore, the container 10 is provided with two sensor connectors 12. A temperature sensor, a glucose sensor, a lactate sensor and/or an optical sensor, in particular a camera, are for example arranged in the sensor connectors 12.

Figure 3:
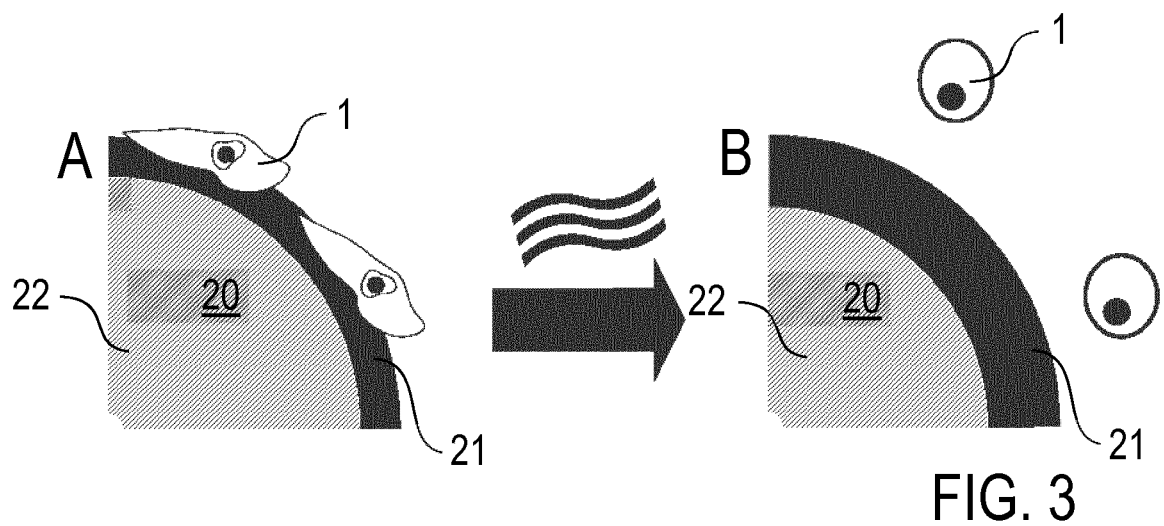
FIG. 3: a schematic illustration of the release of biological cells from the surface of a substrate filament.

FIG. 3 schematically illustrates details of the method for cell processing, in particular the switching of the substrate filaments 20 from the adherence state (FIG. 3A) into the release state (FIG. 3B). The adhesion and expansion of the cells 1 occurs on the substrate filaments 20 which run in the inside of the container 10. The substrate filaments 20 are bundled at the ends and exit the container 10 (see FIG. 2) as a compact light guide bundle. The core of the substrate filaments 20 is the light-guiding material of the light guides 22. The light guided therethrough is emitted in a diffuse manner over the entire light guide 22 at a specific wavelength. The emitted light excites the surface layer 21 located on the light guide 22 and chemically or physically switches properties. For example, a polymer of arginylglycylaspartic acid (RGD) can be switched from adhesive to non-adhesive (and vice-versa) via the APABA linker (4-[(4-aminophenyl)azo]benzocarbonyl), to which the RGD peptide has been conjugated, by light at a wavelength of 366 or 450 nm. If light-switchable calcium scavengers (diazo-2) are introduced into ionotropic hydrogels, the crosslinking from the hydrogel can be bound by the irradiation of light and thus degrade the hydrogel. In this case, adherent cells on such a layer detach from the culturing surface and pass, as suspended cells, into the interior of the container filled with culture medium, from which they can be transported out of the bioreactor via the connected fluid system.

The light guide 22 is unilluminated in the adherence state (no irradiation of the substrate filaments, see FIG. 2). The biological cells 1 are adherently coupled to the surface layer 21 in the adherence state. In this state, the biological cells 1 are cultured with the culture medium 2 (see FIG. 1A), for example for an expansion of the cell culture on the substrate filaments 20 and/or for a differentiation of the cells 1. If a predetermined culture result has been achieved, the light guides 22 are illuminated with the light sources 31 (see FIG. 2). The surface layer 21 is switched into the release state, such that the cells 1 detach from the surface layer 21. The detachment can be promoted by a movement of the culture medium in the surroundings of the substrate filaments.

Figure 4:
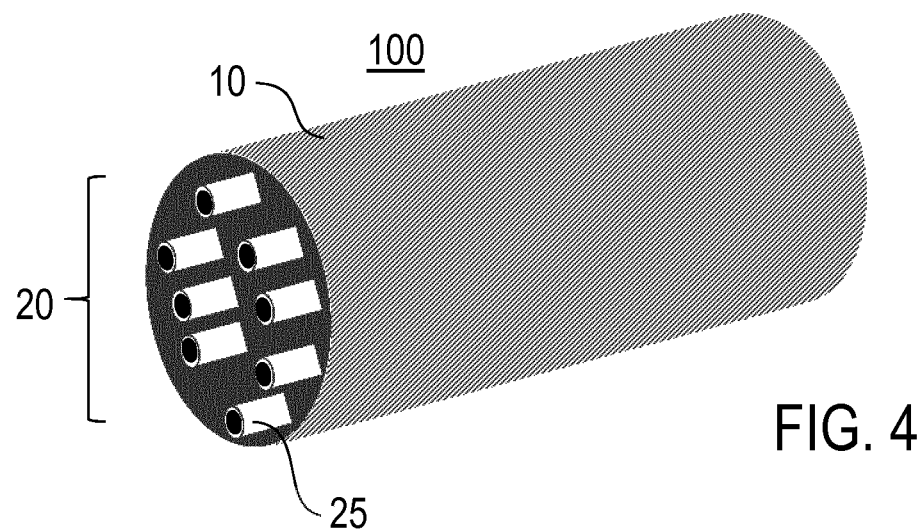
FIG. 4: a schematic depiction of the second embodiment of the bioreactor according to the invention.

FIG. 4 schematically shows the second embodiment of the bioreactor 100 according to the invention. In this embodiment, the substrate filaments 20 comprise hollow fibers 25 which extend in the axial direction of the cylindrical container 10. The hollow fibers 25 are connected to a pump and a temperature-control medium reservoir (not shown). The temperature of the hollow fibers 25 can be adjusted by a temperature-control medium which flows through the hollow fibers 25. For example, switching between the adherence state at a lower temperature and the release state at a higher temperature (or vice-versa) can be provided.

The bioreactor 100 according to FIG. 4 can be dimensioned as described above with reference to FIG. 1. For example, 5000 hollow fibers 25, with an internal diameter of 500 µm and surface layer made of PNIPAAm with a thickness of 0.05 µm, are provided.

Figure 5:
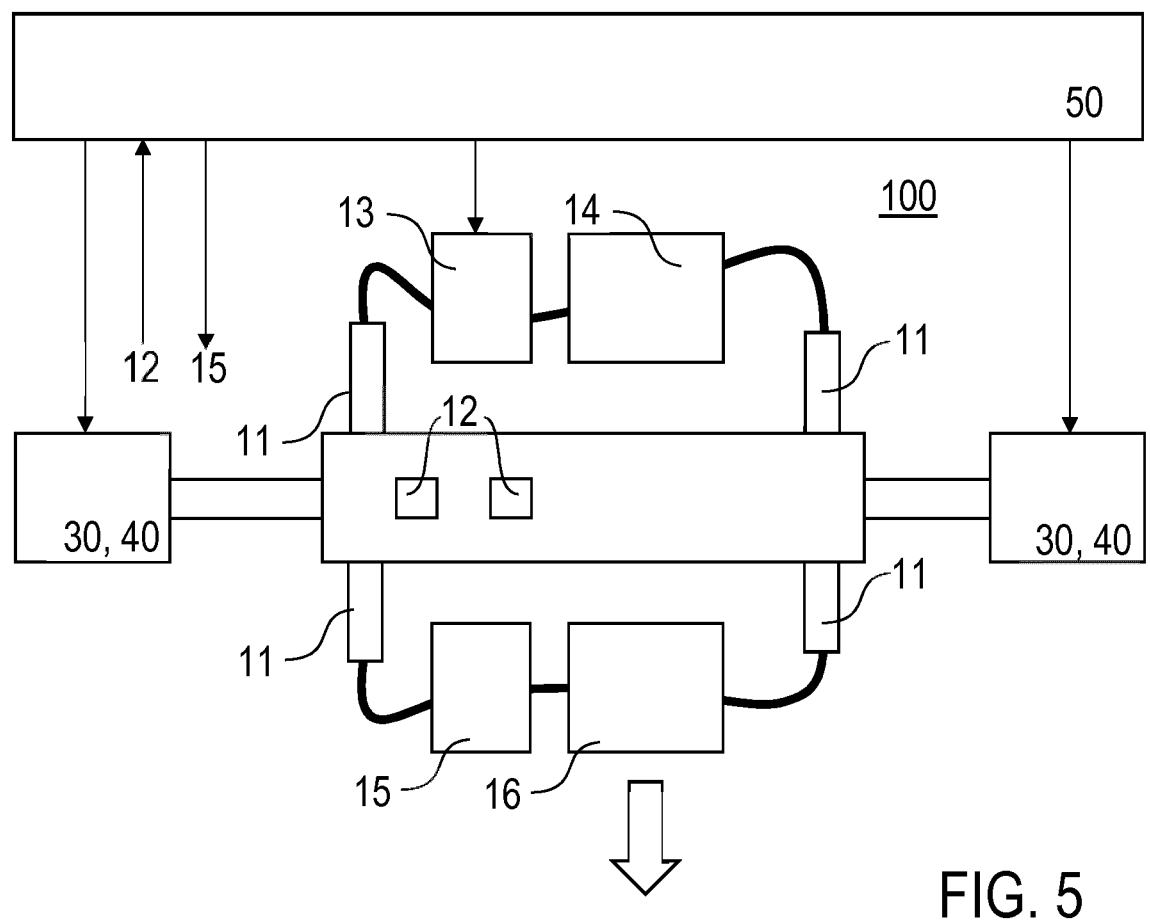
FIG. 5: a schematic depiction of the bioreactor with further components.

FIG. 5 shows a schematic overview of the bioreactor 100, for example according to the first or second embodiment of the invention, with the container 10, in which the substrate filaments (not shown) are arranged, the switching light source device 30 or the temperature-control device 40 and a control device 50. In the illustrated example, the container 10 is provided with four fluid connectors 11, which are coupled to a first fluid system comprising a first pump and a culture medium reservoir 14, to a second fluid system comprising a second pump 15 and a flushing medium reservoir 16. The control device 50 is connected to the components 30, 40 and the pumps 13, 15, and also to the sensors at the sensor connectors 12. In addition, the fluid system can be provided with blocking elements, for example switchable valves, in order to be selectively coupled to the container 10. The blocking elements can also be controlled with the control device 50. Alternatively, only one fluid system can be provided, if the cells are flushed out of the container with the culture medium.

The provision of the control device 50, which is for example formed by a computer circuit, advantageously affords the possibility of automating operation of the bioreactor 100. A control loop can be created, wherein a culture state of the cells is detected as a function of signals from the sensors at the sensor connectors 12 or as a function of a predetermined culture protocol. Depending on the culture state, the pump 13 can be controlled to supply the culture medium, or the switching of the substrate filaments from the adherence state into the release state can be triggered. Furthermore, in the release state, the control device 50 can be used to control the pump 15 for flushing the cultured cells out of the container 10 and for collecting the detached cells in the flushing medium reservoir 16 and for discharging the cells for further cell processing (see arrow).

The invention is not limited to the above-described preferred embodiments. Rather, a plurality of variants and modifications is possible, which also form part of the inventive concept and are therefore within the scope of protection. The invention particularly also claims protection for the subject matter and the features of the dependent claims and the combinations thereof, regardless of the claims referred to in each case.

The invention claimed is:

1. A method for processing biological cells in a bioreactor configured for culturing biological cells, said bioreactor comprising:
   a container comprising a container wall closed on all sides, and
   a plurality of light guides which are optical fibers arranged in the container, extend in an axial direction of the container, and are configured for temporary adherent coupling of the biological cells to the light guides,
   wherein the light guides are provided with a surface layer comprising a polymer of arginylglycylaspartic acid (RGD) with a (4-[(4aminophenyl)azo]benzocarbonyl) (APABA) linker, which is switchable in response to light between an adherence state, in which the biological cells can be coupled to the surface layer in an adherent manner, and a release state, in which the adherent coupling of the biological cells to the surface layer is reduced compared to the adherence state,
   said method comprising the steps of:
   introducing a culture medium and the biological cells into the container,
   connecting the light guides to a switching light source device,
   setting the adherence state of the light guides by switching-on an illumination of the surface layer out of the light guides,
   adherently coupling the biological cells to the light guides,
   culturing the adherently coupled biological cells,
   setting the release state of the light guides by switching-off the illumination of the surface layer out of the light guides, and
   detaching the biological cells from the light guides.

2. The method of claim 1, wherein the surface layer is illuminated by evanescent waves, each of which penetrates from inside the light guides into the surface layer.

3. The method of claim 1, wherein the switching light source device is part of the bioreactor and is securely connected to the light guides.

4. The method of claim 1, wherein the surface layer comprises a light-responsive hydrogel layer.

5. The method of claim 1, wherein the container has at least two fluid connectors through which a liquid flushing medium flows, wherein in the release state, the adherent coupling of the biological cells to the surface layer is reduced such that the biological cells are separated from the light guides by flow forces of the liquid flushing medium.

6. The method of claim 1, wherein the container has at least one sensor connector which integrates at least one sensor into the bioreactor.

* * * * *